(12) United States Patent
Viswanathan et al.

(10) Patent No.: US 12,088,589 B2
(45) Date of Patent: Sep. 10, 2024

(54) METHOD, SYSTEM, AND COMPUTER PROGRAM PRODUCT FOR CONTROLLING ACCESS IN A NETWORK OF SERVERS

(71) Applicant: VISA INTERNATIONAL SERVICE ASSOCIATION, San Francisco, CA (US)

(72) Inventors: Shankar Narayanan Viswanathan, Newark, CA (US); Dilip Shekhar, Palo Alto, CA (US); Whitney LaRose Nelson, Atlanta, GA (US)

(73) Assignee: Visa International Service Association, San Francisco, CA (US)

( * ) Notice: Subject to any disclaimer, the term of this patent is extended or adjusted under 35 U.S.C. 154(b) by 433 days.

(21) Appl. No.: 17/432,956

(22) PCT Filed: Apr. 18, 2019

(86) PCT No.: PCT/US2019/028088
§ 371 (c)(1),
(2) Date: Aug. 23, 2021

(87) PCT Pub. No.: WO2020/214175
PCT Pub. Date: Oct. 22, 2020

(65) Prior Publication Data
US 2022/0182386 A1    Jun. 9, 2022

(51) Int. Cl.
*H04L 9/40* (2022.01)
*G06Q 20/16* (2012.01)
*G06Q 20/38* (2012.01)

(52) U.S. Cl.
CPC .............. *H04L 63/10* (2013.01); *G06Q 20/16* (2013.01); *G06Q 20/3829* (2013.01)

(58) Field of Classification Search
CPC .................... H04L 63/10–108; G06F 21/62
See application file for complete search history.

(56) References Cited

U.S. PATENT DOCUMENTS 9,432,454 B2    8/2016 Chakraborty et al.
9,998,497 B2 *  6/2018 Ylonen ............... H04L 9/0891
(Continued)

FOREIGN PATENT DOCUMENTS

CN    103503408 A       1/2014
CN    106469376 A *     3/2017
(Continued)

OTHER PUBLICATIONS

Joshi, "Finding the Shortest Path, With a Little Help From Dijkstra", Oct. 16, 2017, retrieved from https://medium.com/basecs/finding-the-shortest-path-with-a-little-help-from-dijkstra-613149fbdcSe>, 18 pages.

*Primary Examiner* — Madhuri R Herzog
(74) *Attorney, Agent, or Firm* — The Webb Law Firm

(57) ABSTRACT

Provided is a method for controlling access in a network of servers, which may include generating a set of nodes including a node for each account of each server. For each respective node, at least one other node of the set of nodes having credential-free access to the respective node may be determined. For each respective node, an edge connecting the respective node to each of the other node(s) of the set of nodes having credential-free access may be generated. The set of nodes and edges may collectively define a graph. For at least a first node, second nodes of the set of nodes that have indirect access to the first node(s) via at least one of the other node(s) having credential-free access to the first node(s) may be determined based on the graph. A system and computer program product are also disclosed.

20 Claims, 7 Drawing Sheets

(56) References Cited

U.S. PATENT DOCUMENTS

| | | |
|---|---|---|
| 2003/0200430 A1 | 10/2003 | Leyland et al. |
| 2008/0109374 A1 | 5/2008 | Levergood et al. |
| 2013/0290704 A1 | 10/2013 | Giniger et al. |
| 2014/0068717 A1 | 3/2014 | Mayes et al. |
| 2014/0189530 A1* | 7/2014 | Anand ............... G06Q 30/0201 715/753 |
| 2017/0346804 A1 | 11/2017 | Beecham |
| 2018/0191725 A1 | 7/2018 | Luukkala |
| 2018/0191726 A1 | 7/2018 | Luukkala |
| 2019/0013943 A1 | 1/2019 | Maim |

FOREIGN PATENT DOCUMENTS

| | | | | |
|---|---|---|---|---|
| CN | 108418825 A | * | 8/2018 | ........... H04L 41/145 |
| CN | 109643350 A | | 4/2019 | |

\* cited by examiner

METHOD, SYSTEM, AND COMPUTER PROGRAM PRODUCT FOR CONTROLLING ACCESS IN A NETWORK OF SERVERS

CROSS-REFERENCE TO RELATED APPLICATION

This application is the United States national phase of International Application No. PCT/US2019/028088 filed Apr. 18, 2019, the entire disclosure of which is incorporated by reference in its entirety.

BACKGROUND

1. Technical Field

This disclosed subject matter relates generally to methods, systems, and products for controlling access in a network of servers and, in some particular embodiments or aspects, to a method, system, and computer program product for controlling access in a network of servers based on graphs.

2. Technical Considerations

Certain networks (e.g., local area networks, wide area networks, metropolitan area networks, telephone networks, private networks, ad hoc networks, intranet, Internet, fiber optic-based networks, cloud computing networks, application hosting networks, and/or the like) may include a plurality of servers. Additionally, accounts (e.g., of users, applications, services, administrators, and/or the like) on some such servers may need to access accounts on other servers within the network, e.g., to enable a certain function (e.g., of an application, service, and/or the like) or fulfill some responsibility (e.g., of a user, administrator, and/or the like). To facilitate and/or expedite such access, some accounts on some servers may be granted direct and/or credential-free access (e.g., key-based access) to accounts on other servers. Such direct and/or credential-free access may include a source entity (e.g., first account) requesting access and a destination entity (e.g., second account) to which access is requested.

However, such direct and/or credential-free access may also create indirect (e.g., transitive) access. For example, another account (e.g., third account) may have access (e.g., direct and/or credential-free access) to the source entity (e.g., first account), such that the other account (e.g., third account) may gain access to the destination entity (e.g., second account) through the source account (e.g., first account). In certain circumstances, such indirect (e.g., transitive) access may be unintended and/or unknown to the destination entity (e.g., second account) when access is granted to the source entity (e.g., first account). Additionally, it may be difficult for an entity (e.g., the destination entity/second account) to detect and/or determine whether one or more indirect (e.g., transitive) accesses exist or which entities may be using such indirect accesses. Further, as the size of a network increases, the number of such indirect (e.g., transitive) accesses may increase (e.g., increase exponentially, increase geometrically, and/or the like).

Moreover, even if such indirect (e.g., transitive) access is discovered, it may be difficult for a destination entity (e.g., second account) to determine a number of users (e.g., human users, applications, services, and/or the like) with access (e.g., credentialed and/or password-based access) to the other account(s) (e.g., third account and/or the like) and/or quantify the indirect access(es). As such, it may be difficult to judge (e.g., by the destination entity, an administrator, and/or the like) whether the indirect (e.g., transitive) access merits terminating one or more direct and/or credential-free accesses.

In addition, manually evaluating each direct access in a network of servers (especially a relatively large network of tens, hundreds, or even thousands of servers) to identify indirect (e.g., transitive) accesses and analyze the impact thereof may require considerable time, expense, and dedication of resources (e.g., both human and computer resources), and such a manual process may introduce the potential for human error. Additionally or alternatively, if each requestor/source entity must wait for manual review of a request for access, the waiting time for such requests may be long and/or may increase as the number of direct and/or indirect accesses in the network grows, all of which may be inefficient.

Furthermore, if such indirect (e.g., transitive) accesses are not appropriately identified and/or monitored, an attacker (e.g., computer hacker, unscrupulous/malicious user, and/or the like) may gain access to an unknown number of accounts and/or servers by simply accessing one account that has indirect access to others.

SUMMARY

Accordingly, it is an object of the presently disclosed subject matter to provide methods, systems, and computer program products for controlling access in a network of servers.

According to non-limiting embodiments or aspects, provided is a method for controlling access in a network of servers. In some non-limiting embodiments or aspects, a method for controlling access in a network of servers, wherein each server may be associated with at least one account, may include generating a set of nodes including a node for each account of each server of the network of servers. For each respective node of the set of nodes, at least one other node of the set of nodes having credential-free access to the respective node may be determined. For each respective node of the set of nodes, an edge may be generated connecting the respective node to each of the other node(s) having credential-free access to the respective node. The set of nodes and the edges may define a graph. A weight for each edge may be determined based on a number of users associated with the account of the other node. For at least one first node of the set of nodes, at least one second node of the set of nodes may be determined. The second node(s) may have indirect access to the first node(s) via a path of edges from the second node(s) through at least one of the other node(s) having credential free access to the first node(s). For each respective second node of the at least one second node, a weight of the path of edges between the respective second node and the first node(s) may be determined based on the weight of each edge of the path of edges.

In some non-limiting embodiments or aspects, each node of the set of nodes may include a public key. Additionally or alternatively, for each respective node of the set of nodes, the other node(s) having credential-free access to the respective node may include a private key associated with the public key of the respective node.

In some non-limiting embodiments or aspects, each account may be associated with an account type; each account may be associated with an application, which may have an application criticality rating; and/or each server may be associated with an environment type. Additionally or alternatively, determining the weight for each edge may include determining the weight for each edge further based on at least one of the account type of the account of the respective node, the account type of the account of the at least one other node, the environment of the server of the respective node, the environment of the server of the at least one other node, the application criticality rating of the application associated with the account of the respective node, the application criticality rating of the application associated with the account of the at least one other node, any combination thereof, and/or the like. Additionally or alternatively, determining the weight for each edge may include determining the weight for each edge further based on whether the account of the respective node and the account of the at least one other node are the same account.

In some non-limiting embodiments or aspects, credential-free access between the first node(s) and at least one of the other node(s) may be terminated based on the weight of the path of edges between the second node(s) and the first node(s) through the at least one of the other node(s).

In some non-limiting embodiments or aspects, a rules configuration file associated with rules for determining the weight for each edge may be received. Additionally or alternatively, determining the weight for each edge may include determining the weight for each edge further based on the rules configuration file.

According to non-limiting embodiments or aspects, provided is a system for controlling access in a network. In some non-limiting embodiments or aspects, the system for controlling access in a network may include a network of servers. Each server may be associated with at least one account. The system may further include at least one processor and at least one non-transitory computer-readable medium comprising instructions to direct the at least one processor to generate a set of nodes comprising a node for each account of each server of a network of servers. For each respective node of the set of nodes, at least one other node of the set of nodes having credential-free access to the respective node may be determined. For each respective node of the set of nodes, an edge may be generated connecting the respective node to each of the other node(s) having credential-free access to the respective node. The set of nodes and the edges may define a graph. A weight for each edge may be determined based on a number of users associated with the account of the other node. For at least one first node of the set of nodes, at least one second node of the set of nodes may be determined. The second node(s) may have indirect access to the first node(s) via a path of edges from the second node(s) through at least one of the other node(s) having credential-free access to the first node(s). For each respective second node of the at least one second node, a weight of the path of edges between the respective second node and the first node(s) may be determined based on the weight of each edge of the path of edges.

In some non-limiting embodiments or aspects, each node of the set of nodes may include a public key. Additionally or alternatively, for each respective node of the set of nodes, the other node(s) having credential-free access to the respective node may include a private key associated with the public key of the respective node.

In some non-limiting embodiments or aspects, each account may be associated with an account type; each account may be associated with an application, which may have an application criticality rating; and/or each server may be associated with an environment type. Additionally or alternatively, determining the weight for each edge may include determining the weight for each edge further based on at least one of the account type of the account of the respective node, the account type of the account of the at least one other node, the environment of the server of the respective node, the environment of the server of the at least one other node, the application criticality rating of the application associated with the account of the respective node, the application criticality rating of the application associated with the account of the at least one other node, any combination thereof, and/or the like. Additionally or alternatively, determining the weight for each edge may include determining the weight for each edge further based on whether the account of the respective node and the account of the at least one other node are the same account.

In some non-limiting embodiments or aspects, credential-free access between the first node(s) and at least one of the other node(s) may be terminated based on the weight of the path of edges between the second node(s) and the first node(s) through the at least one of the other node(s).

In some non-limiting embodiments or aspects, a rules configuration file associated with rules for determining the weight for each edge may be received. Additionally or alternatively, determining the weight for each edge may include determining the weight for each edge further based on the rules configuration file.

According to non-limiting embodiments or aspects, provided is a computer program product for controlling access in a network of servers, each server associated with at least one account. The computer program product may include at least one non-transitory computer-readable medium including one or more instructions that, when executed by at least one processor, cause the at least one processor to generate a set of nodes comprising a node for each account of each server of a network of servers. For each respective node of the set of nodes, at least one other node of the set of nodes having credential-free access to the respective node may be determined. For each respective node of the set of nodes, an edge may be generated connecting the respective node to each of the other node(s) having credential-free access to the respective node. The set of nodes and the edges may define a graph. A weight for each edge may be determined based on a number of users associated with the account of the other node. For at least one first node of the set of nodes, at least one second node of the set of nodes may be determined. The second node(s) may have indirect access to the first node(s) via a path of edges from the second node(s) through at least one of the other node(s) having credential-free access to the first node(s). For each respective second node of the at least one second node, a weight of the path of edges between the respective second node and the first node(s) may be determined based on the weight of each edge of the path of edges.

In some non-limiting embodiments or aspects, each node of the set of nodes may include a public key. Additionally or alternatively, for each respective node of the set of nodes, the other node(s) having credential-free access to the respective node may include a private key associated with the public key of the respective node.

In some non-limiting embodiments or aspects, each account may be associated with an account type; each account may be associated with an application, which may have an application criticality rating; and/or each server may be associated with an environment type. Additionally or alternatively, determining the weight for each edge may include determining the weight for each edge further based on at least one of the account type of the account of the respective node, the account type of the account of the at least one other node, the environment of the server of the respective node, the environment of the server of the at least one other node, the application criticality rating of the application associated with the account of the respective node, the application criticality rating of the application associated with the account of the at least one other node, any combination thereof, and/or the like. Additionally or alternatively, determining the weight for each edge may include determining the weight for each edge further based on whether the account of the respective node and the account of the at least one other node are the same account.

In some non-limiting embodiments or aspects, credential-free access between the first node(s) and at least one of the other node(s) may be terminated based on the weight of the path of edges between the second node(s) and the first node(s) through the at least one of the other node(s).

In some non-limiting embodiments or aspects, a rules configuration file associated with rules for determining the weight for each edge may be received. Additionally or alternatively, determining the weight for each edge may include determining the weight for each edge further based on the rules configuration file.

Further non-limiting embodiments or aspects are set forth in the following numbered clauses:

Clause 1: A method for controlling access in a network of servers, each server associated with at least one account, comprising: generating, with at least one processor, a set of nodes comprising a node for each account of each server of a network of servers; for each respective node of the set of nodes, determining, with at least one processor, at least one other node of the set of nodes having credential-free access to the respective node; for each respective node of the set of nodes, generating, with at least one processor, an edge connecting the respective node to each of the at least one other node of the set of nodes having credential-free access to the respective node, the set of nodes and the edges comprising a graph; determining, with at least one processor, a weight for each edge based on a number of users associated with the account of the at least one other node; for at least one first node of the set of nodes, determining, with at least one processor, at least one second node of the set of nodes having indirect access to the at least one first node via a path of edges from the at least one second node through at least one of the at least one other node having credential-free access to the at least one first node; and for each respective second node of the at least one second node, determining, with at least one processor, a weight of the path of edges between the respective second node and the at least one first node based on the weight of the each edge of the path of edges.

Clause 2: The method of clause 1, wherein each node of the set of nodes comprises a public key.

Clause 3: The method of clauses 1 or 2, wherein, for each respective node of the set of nodes, the at least one other node of the set of nodes having credential-free access to the respective node comprises a private key associated with the public key of the respective node.

Clause 4: The method of any preceding clause, wherein each account is associated with an account type, each account is associated with an application having an application criticality rating, and each server is associated with an environment type, and wherein determining the weight for each edge comprises determining the weight for each edge further based on at least one of the account type of the account of the respective node, the account type of the account of the at least one other node, the environment of the server of the respective node, the environment of the server of the at least one other node, the application criticality rating of the application associated with the account of the respective node, or the application criticality rating of the application associated with the account of the at least one other node.

Clause 5: The method of any preceding clause, wherein determining the weight for each edge comprises determining the weight for each edge further based on whether the account of the respective node and the account of the at least one other node are the same account.

Clause 6: The method of any preceding clause, further comprising terminating, with at least one processor, credential-free access between the at least one first node and the at least one of the at least one other node based on the weight of the path of edges between the at least one second node and the at least one first node through the at least one of the at least one other node.

Clause 7: The method of any preceding clause, further comprising receiving, with at least one processor, a rules configuration file associated with rules for determining the weight for each edge, wherein determining the weight for each edge comprises determining the weight for each edge further based on the rules configuration file.

Clause 8: A system for controlling access in a network, comprising: a network of servers, each server associated with at least one account; at least one processor; and at least one non-transitory computer readable medium comprising instructions to direct the at least one processor to: generate a set of nodes comprising a node for each account of each server of a network of servers; for each respective node of the set of nodes, determine at least one other node of the set of nodes having credential-free access to the respective node; for each respective node of the set of nodes, generate an edge connecting the respective node to each of the at least one other node of the set of nodes having credential-free access to the respective node, the set of nodes and the edges comprising a graph; determine a weight for each edge based on a number of users associated with the account of the at least one other node; for at least one first node of the set of nodes, determine at least one second node of the set of nodes having indirect access to the at least one first node via a path of edges from the at least one second node through at least one of the at least one other node having credential-free access to the at least one first node; and for each respective second node of the at least one second node, determine a weight of the path of edges between the respective second node and the at least one first node based on the weight of the each edge of the path of edges.

Clause 9: The system of clause 8, wherein each node of the set of nodes comprises a public key.

Clause 10: The system of clauses 8 or 9, wherein, for each respective node of the set of nodes, the at least one other node of the set of nodes having credential-free access to the respective node comprises a private key associated with the public key of the respective node.

Clause 11: The system of any one of clauses 8-10, wherein each account is associated with an account type, each account is associated with an application having an application criticality rating, and each server is associated with an environment type, and wherein determining the weight for each edge comprises determining the weight for each edge further based on at least one of the account type of the account of the respective node, the account type of the account of the at least one other node, the environment of the server of the respective node, the environment of the server of the at least one other node, the application criticality rating of the application associated with the account of the respective node, or the application criticality rating of the application associated with the account of the at least one other node.

Clause 12: The system of any one of clauses 8-11, wherein determining the weight for each edge comprises determining the weight for each edge further based on whether the account of the respective node and the account of the at least one other node are the same account.

Clause 13: The system of any one of clauses 8-12, wherein the instructions further direct the at least one processor to terminate credential-free access between the at least one first node and the at least one of the at least one other node based on the weight of the path of edges between the at least one second node and the at least one first node through the at least one of the at least one other node.

Clause 14: The system of any one of clauses 8-13, wherein the instructions further direct the at least one processor to receive a rules configuration file associated with rules for determining the weight for each edge, wherein determining the weight for each edge comprises determining the weight for each edge further based on the rules configuration file.

Clause 15: A computer program product for controlling access in a network of servers, each server associated with at least one account, the computer program product comprising at least one non-transitory computer-readable medium including one or more instructions that, when executed by at least one processor, cause the at least one processor to: generate a set of nodes comprising a node for each account of each server of a network of servers; for each respective node of the set of nodes, determine at least one other node of the set of nodes having credential-free access to the respective node; for each respective node of the set of nodes, generate an edge connecting the respective node to each of the at least one other node of the set of nodes having credential-free access to the respective node, the set of nodes and the edges comprising a graph; determine a weight for each edge based on a number of users associated with the account of the at least one other node; for at least one first node of the set of nodes, determine at least one second node of the set of nodes having indirect access to the at least one first node via a path of edges from the at least one second node through at least one of the at least one other node having credential-free access to the at least one first node; and for each respective second node of the at least one second node, determine a weight of the path of edges between the respective second node and the at least one first node based on the weight of the each edge of the path of edges.

Clause 16: The computer program product of clause 15, wherein each node of the set of nodes comprises a public key, and wherein, for each respective node of the set of nodes, the at least one other node of the set of nodes having credential-free access to the respective node comprises a private key associated with the public key of the respective node.

Clause 17: The computer program product of clauses 15 or 16, wherein each account is associated with an account type, each account is associated with an application having an application criticality rating, and each server is associated with an environment type, and wherein determining the weight for each edge comprises determining the weight for each edge further based on at least one of the account type of the account of the respective node, the account type of the account of the at least one other node, the environment of the server of the respective node, the environment of the server of the at least one other node, the application criticality rating of the application associated with the account of the respective node, or the application criticality rating of the application associated with the account of the at least one other node.

Clause 18: The computer program product of any one of clauses 15-17, wherein determining the weight for each edge comprises determining the weight for each edge further based on whether the account of the respective node and the account of the at least one other node are the same account.

Clause 19: The computer program product of any one of clauses 15-18, wherein the instructions further direct the at least one processor to terminate credential-free access between the at least one first node and the at least one of the at least one other node based on the weight of the path of edges between the at least one second node and the at least one first node through the at least one of the at least one other node.

Clause 20: The computer program product of any one of clauses 15-19, wherein the instructions further direct the at least one processor to receive a rules configuration file associated with rules for determining the weight for each edge, and wherein determining the weight for each edge comprises determining the weight for each edge further based on the rules configuration file.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

Figure 1:
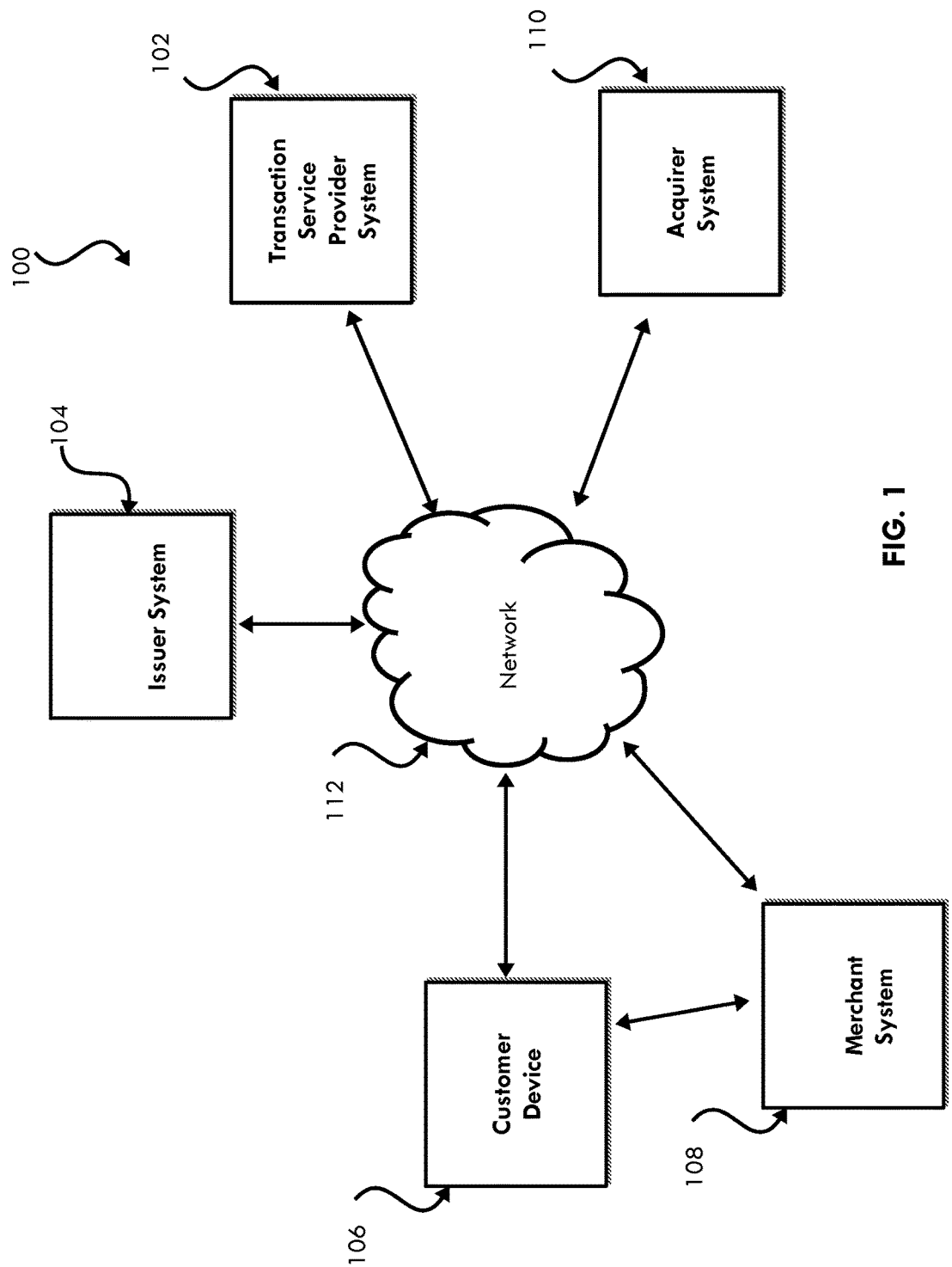
FIG. 1 is a diagram of a non-limiting embodiment or aspect of an electronic payment network in which methods, systems, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "issuer institution," "portable financial device issuer," "issuer," or "issuer bank" may refer to one or more entities that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The terms "issuer institution" and "issuer institution system" may also refer to one or more computer systems operated by or on behalf of an issuer institution, such as a server computer executing one or more software applications. For example, an issuer institution system may include one or more authorization servers for authorizing a transaction.

As used herein, the term "account identifier" may include one or more types of identifiers associated with a user account (e.g., a PAN, a card number, a payment card number, a token, and/or the like). In some non-limiting embodiments or aspects, an issuer institution may provide an account identifier (e.g., a PAN, a token, and/or the like) to a user that uniquely identifies one or more accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments or aspects, the account identifier may be an original account identifier, where the original account identifier was provided to a user at the creation of the account associated with the account identifier. In some non-limiting embodiments or aspects, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in one or more data structures (e.g., one or more databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments or aspects, a payment token may be "format preserving" and may have a numeric format that conforms to the account identifiers used in existing payment processing networks (e.g., ISO 8583 financial transaction message format). In some non-limiting embodiments or aspects, a payment token may be used in place of a PAN to initiate, authorize, settle, or resolve a payment transaction or represent the original credential in other systems where the original credential would typically be provided. In some non-limiting embodiments or aspects, a token value may be generated such that the recovery of the original PAN or other account identifier from the token value may not be computationally derived (e.g., with a one-way hash or other cryptographic function). Further, in some non-limiting embodiments or aspects, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments or aspects, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments or aspects, a requestor may interface with a network token system through any suitable communication network and/or protocol (e.g., using HTTPS, SOAP, and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments or aspects, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments or aspects, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments or aspects, token requestor identifiers may be revoked and/or token requestors may be assigned new token requestor identifiers. In some non-limiting embodiments or aspects, this information may be subject to reporting and audit by the token service provider.

As used herein, the term a "token service provider" may refer to an entity including one or more server computers in a token service system that generates, processes, and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments or aspects, the token service provider may have the ability to set aside licensed BINs as token BINs to issue tokens for the PANs that may be submitted to the token service provider. In some non-limiting embodiments or aspects, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments or aspects, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments or aspects, the token vault may be a part of a token service system. For example, the token vault may be provided as a part of the token service provider. Additionally or alternatively, the token vault may be a remote repository accessible by the token service provider. In some non-limiting embodiments or aspects, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to one or more entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to one or more computer systems operated by or on behalf of a merchant, such as a server computer executing one or more software applications. As used herein, the term "product" may refer to one or more goods and/or services offered by a merchant.

As used herein, a "point-of-sale (POS) device" may refer to one or more devices, which may be used by a merchant to initiate transactions (e.g., a payment transaction), engage in transactions, and/or process transactions. For example, a POS device may include one or more computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, a "point-of-sale (POS) system" may refer to one or more computers and/or peripheral devices used by a merchant to conduct a transaction. For example, a POS system may include one or more POS devices and/or other like devices that may be used to conduct a payment transaction. A POS system (e.g., a merchant POS system) may also include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments or aspects, a transaction service provider may include a credit card company, a debit card company, and/or the like. As used herein, the term "transaction service provider system" may also refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "acquirer" may refer to an entity licensed by the transaction service provider and approved by the transaction service provider to originate transactions (e.g., payment transactions) using a portable financial device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions using a portable financial device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments or aspects, an acquirer may be a financial institution, such as a bank.

As used herein, the terms "electronic wallet," "electronic wallet mobile application," and "digital wallet" may refer to one or more electronic devices and/or one or more software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to one or more computer systems, computer devices, servers, groups of servers, and/or the like operated by or on behalf of an electronic wallet provider.

As used herein, the term "portable financial device" may refer to a payment device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the portable financial device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway and/or to a payment gateway itself. The term "payment gateway mobile application" may refer to one or more electronic devices and/or one or more software applications configured to provide payment services for transactions (e.g., payment transactions, electronic payment transactions, and/or the like).

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), personal digital assistants (PDAs), and/or the like. Moreover, the term "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for controlling access in a network of servers, including, but not limited to, controlling access in a network of servers based on graphs. For example, non-limiting embodiments or aspects of the disclosed subject matter provide controlling access in a network of servers using a graph with nodes for each account of each host and (directional) edges representing direct/credential-free access between the nodes, where the edges are weighted based on the connected nodes, including the credentialed (e.g., password-based) users of the account of each node. Such non-limiting embodiments or aspects provide techniques and systems that enable identification of indirect (e.g., transitive) access between the nodes. For example, by traversing the graph, at least one path of edges can be identified from a destination node (e.g., first node) through a source node (e.g., second node having direct/credential-free access to the first node) to a third node that has gained access (e.g., unintentionally gained indirect/transitive access) to the destination node through the source node. Thus, nodes (e.g., the third node and/or the like) that have indirect access to each destination node may be determined and/or identified. Additionally or alternatively, based on the number of credentialed (e.g., password-based and/or the like) users (e.g., human users, applications, services, and/or the like) or other criteria/factors associated with each node in the path (e.g., the source node and/or indirectly connected nodes, such as the third node and/or the like), a weight may be assigned to each edge (or each node in the path). Thus, a total weight of each edge (or each node) along the path may be indicative of (e.g., quantify) not only a number of indirect/transitive accesses that result from credential-free accesses but also a number of credentialed users that have (unintentionally) gained access (e.g., via direct and/or indirect access) and other criteria/factors associated with risk posed by the accesses. Further, such weighting/quantification may enable a determination (e.g., by the destination entity, an administrator, and/or the like) whether the indirect (e.g., transitive) access merits terminating one or more direct and/or credential-free accesses. Additionally or alternatively, the size of the graph may increase as the size of the network increases, and the same graph traversal and weighting techniques may be applied (e.g., repeatedly, periodically, continuously, and/or the like) as the graph grows. Accordingly, the disclosed techniques and systems are scalable while improving efficiency. Additionally or alternatively, the disclosed techniques and systems reduce and/or eliminate the need for manual review of the direct/credential-free accesses and/or indirect/transitive accesses, thus reducing and/or eliminating the potential for human error and improving efficiency while reducing wait times. Further, using the disclosed techniques and systems, the graph and weights may be updated automatically (e.g., repeatedly, periodically, continuously, and/or the like), so such output may be constantly available for making determinations regarding whether to terminate access(es) and/or approve new requests for access, thus improving efficiency while reducing wait times. Additionally or alternatively, since the disclosed techniques may allow maintaining an up-to-date graph (e.g., updating automatically, repeatedly, periodically, continuously, and/or the like), the impact of any attack and/or breach (e.g., by computer hacker, unscrupulous/malicious user, and/or the like) may be swiftly (e.g., instantly, in real time, and/or the like) identified and/or determined.

For the purpose of illustration, in the following description, while the presently disclosed subject matter is described with respect to methods, systems, and computer program products for controlling access in a network of servers, e.g., controlling access in a network of servers based on graphs, one skilled in the art will recognize that the disclosed subject matter is not limited to the illustrative embodiments. For example, the methods, systems, and computer program products described herein may be used with a wide variety of settings, such as controlling access in any setting suitable for using networks, e.g., an electronic payment network, a computing network, an ad hoc network, a local network, a private network, a virtual private network, a cellular network, a telephone network, the Internet, and/or the like.

Referring now to FIG. 1, FIG. 1 is a diagram of a non-limiting embodiment of an electronic payment network 100 in which systems, products, and/or methods, as described herein, may be implemented. As shown in FIG. 1, electronic payment network 100 includes transaction service provider system 102, issuer system 104, customer device 106, merchant system 108, acquirer system 110, and network 112.

Transaction service provider system 102 may include one or more devices capable of receiving information from and/or communicating information to issuer system 104, customer device 106, merchant system 108, and/or acquirer system 110 via network 112. For example, transaction service provider system 102 may include a computing device, such as a server (e.g., a transaction processing server), a group of servers, and/or other like devices. In some non-limiting embodiments or aspects, transaction service provider system 102 may be associated with a transaction service provider as described herein. In some non-limiting embodiments or aspects, transaction service provider system 102 may be in communication with a data storage device, which may be local or remote to transaction service provider system 102. In some non-limiting embodiments or aspects, transaction service provider system 102 may be capable of receiving information from, storing information in, communicating information to, or searching information stored in the data storage device.

Issuer system 104 may include one or more devices capable of receiving information and/or communicating information to transaction service provider system 102, customer device 106, merchant system 108, and/or acquirer system 110 via network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction service provider system 102, issuer system 104, merchant system 108, and/or acquirer system 110 via network 112. Additionally or alternatively, each customer device 106 may include a device capable of receiving information from and/or communicating information to other customer devices 106 via network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction service provider system 102, issuer system 104, customer device 106, and/or acquirer system 110 via network 112. Merchant system 108 may also include a device capable of receiving information from customer device 106 via network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via the network, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction service provider system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction service provider system 102, issuer system 104, customer device 106, and/or merchant system 108 via network 112. For example, acquirer system 110 may include a computing device, a server, a group of servers, and/or the like. In some non-limiting embodiments or aspects, acquirer system 110 may be associated with an acquirer as described herein.

Network 112 may include one or more wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of electronic payment network 100 may perform one or more functions described as being performed by another set of systems or another set of devices of electronic payment network 100.

Figure 2:
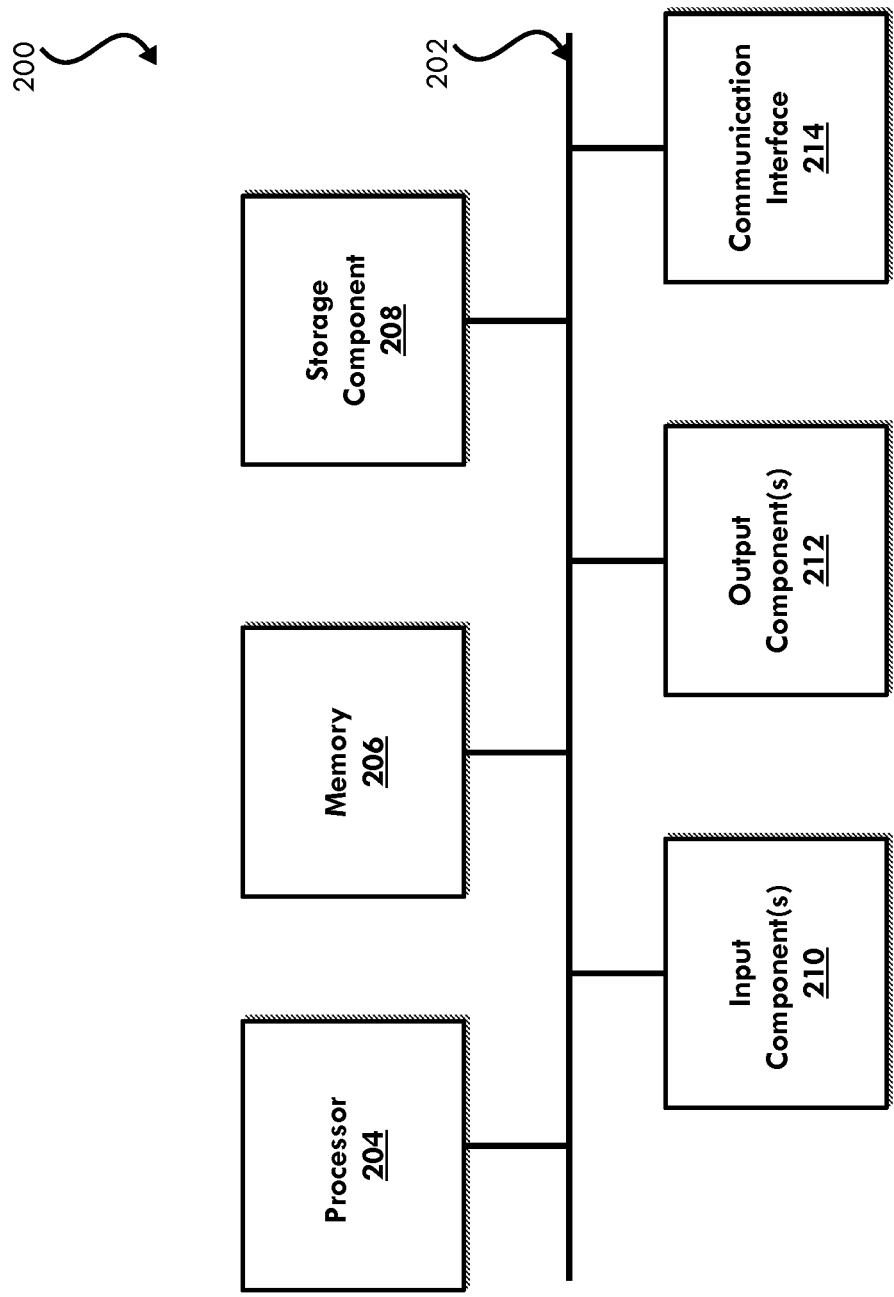
FIG. 2 is a diagram of a non-limiting embodiment or aspect of components of one or more devices of FIG. 1.

Referring now to FIG. 2, FIG. 2 is a diagram of example components of a device 200. Device 200 may correspond to one or more devices of transaction service provider system 102, one or more devices of issuer system 104, customer device 106, one or more devices of merchant system 108, and/or one or more devices of acquirer system 110. In some non-limiting embodiments or aspects, transaction service provider system 102, issuer system 104, customer device 106, merchant system 108, and/or acquirer system 110 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, firmware, or a combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
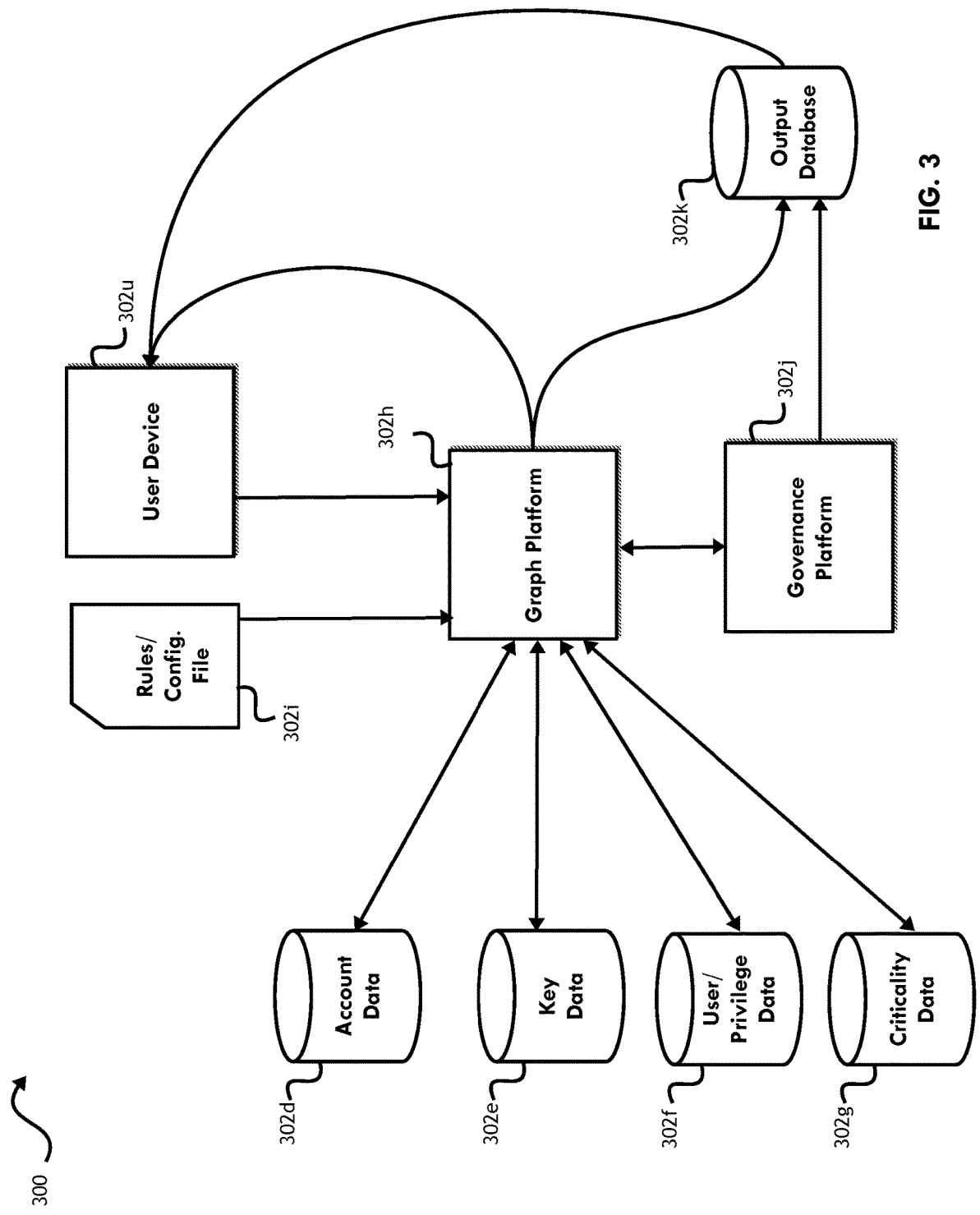
FIG. 3 is a diagram of a non-limiting embodiment of a system for controlling access in a network of servers according to the principles of the presently disclosed subject matter.

Referring now to FIG. 3, FIG. 3 is a diagram of a non-limiting embodiment of an exemplary system 300 for controlling access in a network of servers. As shown in FIG. 3, system 300 may include a plurality of data sources (e.g., account data 302d, key data 302e, user/privilege data 302f, criticality data 302g, and/or the like), graph platform 302h, rules/configuration file 302i, governance platform 302j, output database 302k, and user device 302u. In some non-limiting embodiments or aspects, the plurality of data sources (e.g., 302d-302g), graph platform 302h, rules/configuration file 302i, governance platform 302j, output database 302k, and user device 302u may be the same as, similar to, or part of transaction service provider system 102 (e.g., one or more devices of transaction service provider system 102). Additionally or alternatively, at least some of the plurality of data sources (e.g., 302d-302g), graph platform 302h, rules/configuration file 302i, governance platform 302j, output database 302k, and user device 302u may be implemented (e.g., completely, partially, and/or the like) by another system, another device, another group of systems, or another group of devices, separate from or including transaction service provider system 102, such as issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments or aspects, the plurality of data sources (e.g., 302d-302g), graph platform 302h, rules/configuration file 302i, governance platform 302j, output database 302k, and user device 302u may be configured to perform (e.g., completely, partially, and/or the like) process 400 of FIG. 4, as further described below.

In some non-limiting embodiments or aspects, account data 302d may include a database of data associated with accounts in a network of servers. For example, each server in a network of servers may be associated with at least one account. In some non-limiting embodiments or aspects, each account may include a shell account, an operating system account, a UNIX account, and/or the like. In some non-limiting embodiments or aspects, each account may include a type of account. For example, each account may have at least one of the following types: a root account (e.g., an account with broadest (full and/or the like) access and/or permissions to an entire operating system, such as root, superuser, administrator (admin), supervisor, and/or the like), a service account (e.g., an account for an application, executable program, service, system, operation, and/or the like, which may have reduced access and/or permissions in the operating system compared to the root account), a user account (e.g., an account for a human user to access the server and/or network of servers, which may have reduced access and/or permissions in the operating system compared to the root account), and/or the like. In some non-limiting embodiments or aspects, each account may be associated with an application running in the server environment (e.g., the respective server of the account, a plurality of servers of the network of servers, and/or the like). In some non-limiting embodiments or aspects, account data 302d may be stored in at least one of a comma-separated values (CSV) file, a spreadsheet, a Structured Query Language (SQL) database, a non-SQL database, a messaging cluster (e.g., Apache™ Kafka® and/or the like), a distributed file system (e.g., Apache™ Hadoop®, block chain, and/or the like), and/or the like.

In some non-limiting embodiments or aspects, key data 302e may include a database of data associated with keys (e.g., public keys, private keys, and/or the like) for access (e.g., direct and/or credential-free access) to servers of the network of servers. In some non-limiting embodiments or aspects, such direct and/or credential-free access may be key-based access, e.g., public-key cryptography, asymmetric cryptography, private-key cryptography, Secure Shell (SSH) network protocol, key manager (e.g., Universal Key Manager (UKM)), and/or the like. In some non-limiting embodiments or aspects, each node of the set of nodes may include (e.g., store, be assigned, and/or the like) a public key. Additionally or alternatively, for each respective node, the at least one other node having credential-free access to the respective node may include (e.g., store, be assigned, and/or the like) a private key associated with the public key of the respective node. In some non-limiting embodiments or aspects, the public key and private key may be SSH keys and/or the like. In some non-limiting embodiments or aspects, key data 302e may be stored in at least one of a key manager (e.g., SSH key manager), a CSV file, a spreadsheet, a SQL database, a non-SQL database, a messaging cluster (e.g., Apache™ Kafka® and/or the like), a distributed file system (e.g., Apache™ Hadoop®, blockchain, and/or the like), and/or the like.

In some non-limiting embodiments or aspects, user/privilege data 302f may include a database of data associated with users, privileges (e.g., of the users) for accessing the accounts, and/or the like. For example, user/privilege data 302f may include user identifiers, access rights/privileges of each user identifier, passwords associated with such user identifiers, Unix Privilege Manager (UPM) data, Oracle Identity Management (OIM) data, and/or the like. In some non-limiting embodiments or aspects, users may include human users and/or service users (e.g., applications, services, and/or the like for which a user identifier is created). In some non-limiting embodiments or aspects, user/privilege data 302f may be used for password-based access to the accounts (e.g., accounts stored in account data 302d). In some non-limiting embodiments or aspects, user/privilege data 302f may be stored in at least one of a privilege manager (e.g., UPM), a CSV file, a spreadsheet, a SQL database, a non-SQL database, a messaging cluster (e.g., Apache™ Kafka® and/or the like), a distributed file system (e.g., Apache™ Hadoop®, blockchain, and/or the like), and/or the like.

In some non-limiting embodiments or aspects, user/privilege data 302f may include data associated with access rights and permissions of accounts in the servers and/or operating systems (e.g., Unix) thereof. Additionally or alternatively, user/privilege data 302f may provide access elevation rights, impersonation rights, and/or the like for accounts (e.g., Unix accounts), such as user accounts and/or service accounts.

In some non-limiting embodiments some users and/or services may have credentialed (e.g., password-based and/or the like) access to and/or impersonation rights associated with an account of a node. For example, users (or services) A, B, and C may each have access to account a1, and/or the like.

In some non-limiting embodiments or aspects, criticality data 302g may include a database of data associated with a criticality rating for each application. For example, the criticality rating of each application may be a score and/or ranking of the criticality of the application with respect to other applications based on a plurality of factors. In some non-limiting embodiments or aspects, such factors may include sensitivity of data (e.g., of data handled by the application), business impact (e.g., of losing service of the application), potential reputation damage, potential financial loss, operational risk, personal safety risk, potential legal violations, and/or the like. In some non-limiting embodiments or aspects, the criticality rating may be qualitative (e.g., very high, high, medium, low, very low, and/or the like), quantitative (e.g., a number between 0 and 1, between 0 and 10, and/or the like), a relative ranking (e.g., rank all applications from lowest to highest, highest to lowest, and/or the like), and/or the like. In some non-limiting embodiments or aspects, criticality data 302g may be stored in at least one of a CSV file, a spreadsheet, a SQL database, a non-SQL database, a messaging cluster (e.g., Apache™ Kafka® and/or the like), a distributed file system (e.g., Apache™ Hadoop®, blockchain, and/or the like), and/or the like.

In some non-limiting embodiments or aspects, graph platform 302h may include one or more devices of a system (e.g., at least one server of a network of servers; one or more devices of transaction service provider system 102, issuer system 104, customer device 106, merchant system 108, and/or acquirer system 110; and/or the like). For example, graph platform 302h may include a computing device, a client device, a server, a group of servers, and/or other like devices. In some non-limiting embodiments or aspects, graph platform 302h may be in communication with a data source (e.g., account data 302d, key data 302e, user/privilege data 302f, criticality data 302g, and/or the like), which may be local or remote to graph platform 302h. Additionally or alternatively, graph platform 302h may be in communication with and/or configured to receive a rules/configuration file 302i, which may be local or remote to graph platform 302h. In some non-limiting embodiments or aspects, graph platform 302h may be capable of receiving information from, storing information in, communicating information to, or searching information stored in user device 302u, which may be local or remote to graph platform 302h. In some non-limiting embodiments or aspects, graph platform 302h may be capable of receiving information from, storing information in, communicating information to, or searching information stored in governance platform 302j, which may be local or remote to graph platform 302h. In some non-limiting embodiments or aspects, graph platform 302h may be capable of receiving information from, storing information in, communicating information to, or searching information stored in output database 302k, which may be local or remote to graph platform 302h.

In some non-limiting embodiments or aspects, governance platform 302j may include one or more devices of a system (e.g., at least one server of a network of servers; one or more devices of transaction service provider system 102, issuer system 104, customer device 106, merchant system 108, and/or acquirer system 110; and/or the like). For example, governance platform 302j may include a computing device, a client device, a server, a group of servers, and/or other like devices. In some non-limiting embodiments or aspects, governance platform 302j may be capable of receiving information from, storing information in, communicating information to, or searching information stored in graph platform 302h, which may be local or remote to governance platform 302j. In some non-limiting embodiments or aspects, governance platform 302j may be capable of receiving information from, storing information in, communicating information to, or searching information stored in output database 302k, which may be local or remote to governance platform 302j.

In some non-limiting embodiments or aspects, output database 302k may include a database of data associated with output of graph platform 302h and/or governance platform 302j. In some non-limiting embodiments or aspects, output database 302k may include at least one of a privilege manager (e.g., UPM), SQL database, a non-SQL database, a messaging cluster (e.g., Apache™ Kafka® and/or the like), a distributed file system (e.g., Apache™ Hadoop®, blockchain, and/or the like), and/or the like.

In some non-limiting embodiments or aspects, user device 302u may include one or more devices (e.g., at least one server of a network of servers; one or more devices of transaction service provider system 102, issuer system 104, customer device 106, merchant system 108, and/or acquirer system 110; and/or the like) capable of receiving information from and/or communicating information to graph platform 302h, governance platform 302j, and/or output database 302k. Additionally or alternatively, each user device 302u may include a device capable of receiving information from and/or communicating information to other user devices 302u. For example, user device 302u may include a client device and/or the like.

Figure 4:
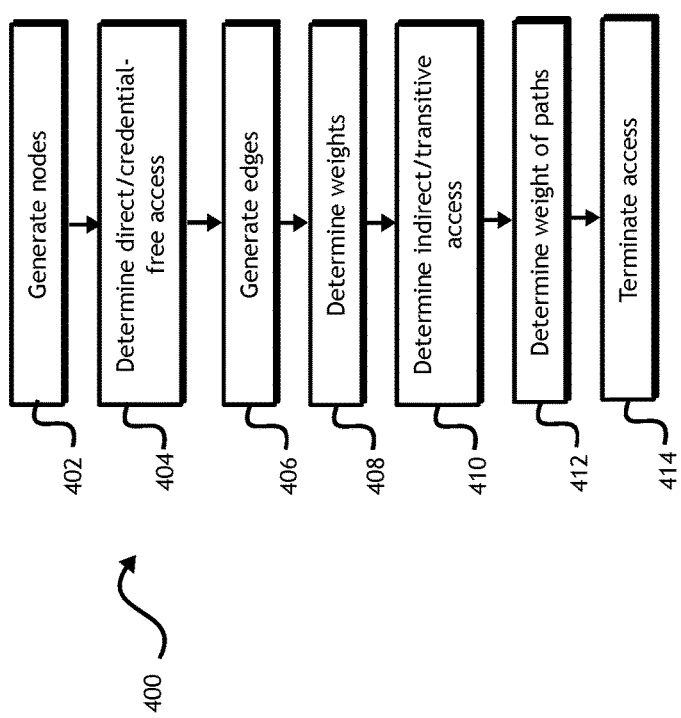
FIG. 4 is a flowchart of a non-limiting embodiment or aspect of a process for controlling access in a network of servers according to the principles of the presently disclosed subject matter.

Referring now to FIG. 4, FIG. 4 is a flowchart of a non-limiting embodiment of a process 400 for controlling access in a network. In some non-limiting embodiments or aspects, one or more of the steps of process 400 may be performed (e.g., completely, partially, and/or the like) by graph platform 302h (e.g., one or more devices of graph platform 302h). In some non-limiting embodiments or aspects, one or more of the steps of process 400 may be performed (e.g., completely, partially, and/or the like) by another system, another device, another group of systems, or another group of devices, separate from or including graph platform 302h, such as system 300 (e.g., one or more devices of system 300), transaction service provider system 102 (e.g., one or more devices of transaction service provider system 102), issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments or aspects, a network of servers may be implemented (e.g., completely, partially, and/or the like) as part of one system (e.g., one of system 300, transaction service provider system 102, issuer system 104, merchant system 108, acquirer system 110, and/or the like). Additionally or alternatively, at least one server of the network of servers may be implemented (e.g., completely, partially, and/or the like) by another separate system (e.g., a third party system; at least one other one of system 300, transaction service provider system 102, issuer system 104, merchant system 108, or acquirer system 110; and/or the like).

As shown in FIG. 4, at step 402, process 400 may include generating nodes. For example, graph platform 302h may generate a set of nodes. In some non-limiting embodiments or aspects, the set of nodes may include a node for each account of each server of a network of servers. Additionally or alternatively, graph platform 302h may determine which accounts are associated with each server based on the account data 302d, as described herein.

Figure 5A:
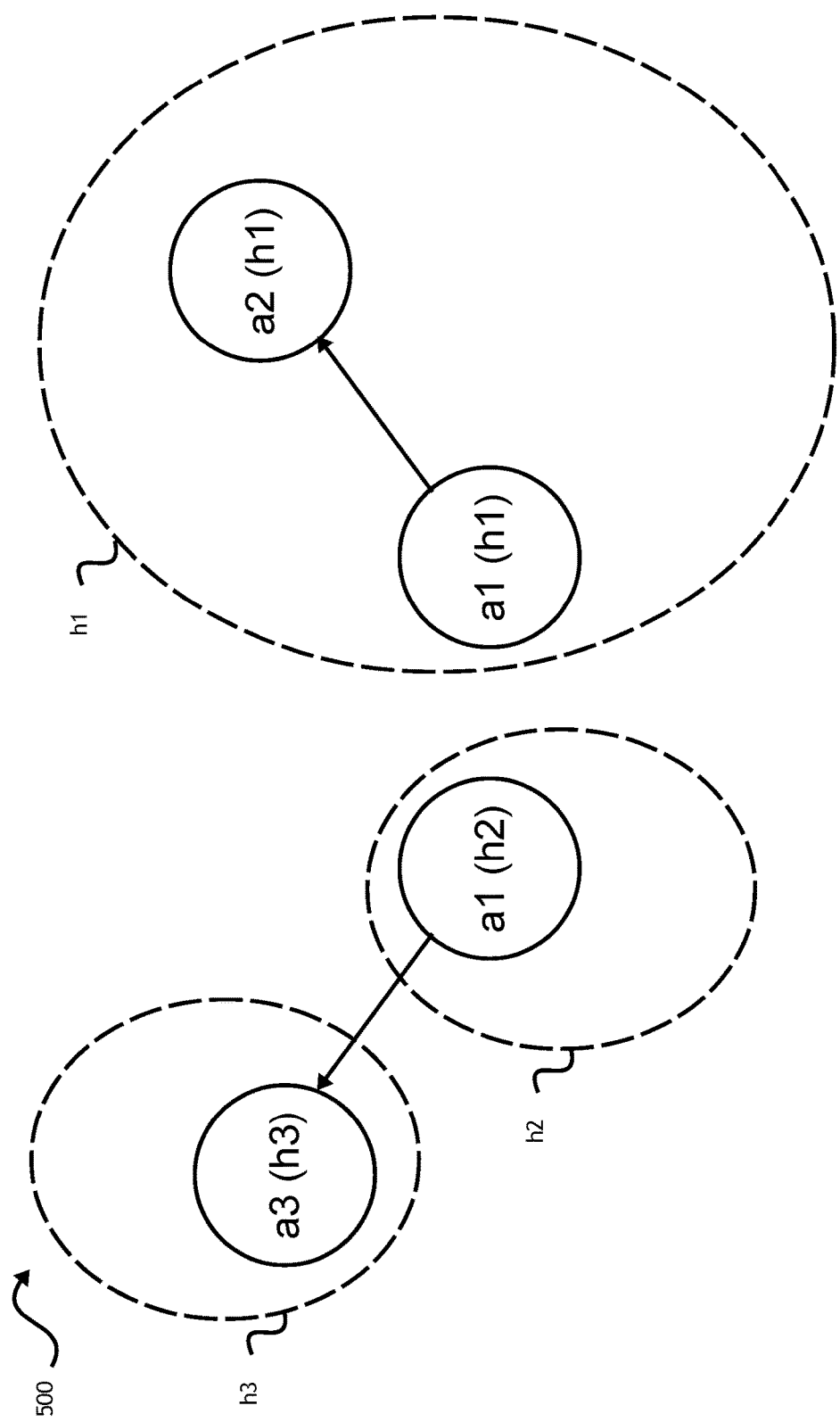
FIGS. 5A-5B are diagrams of a non-limiting embodiment or aspect of an implementation of a non-limiting embodiment of the process shown in FIG. 3 according to the principles of the presently disclosed subject matter.
Figure 5B:
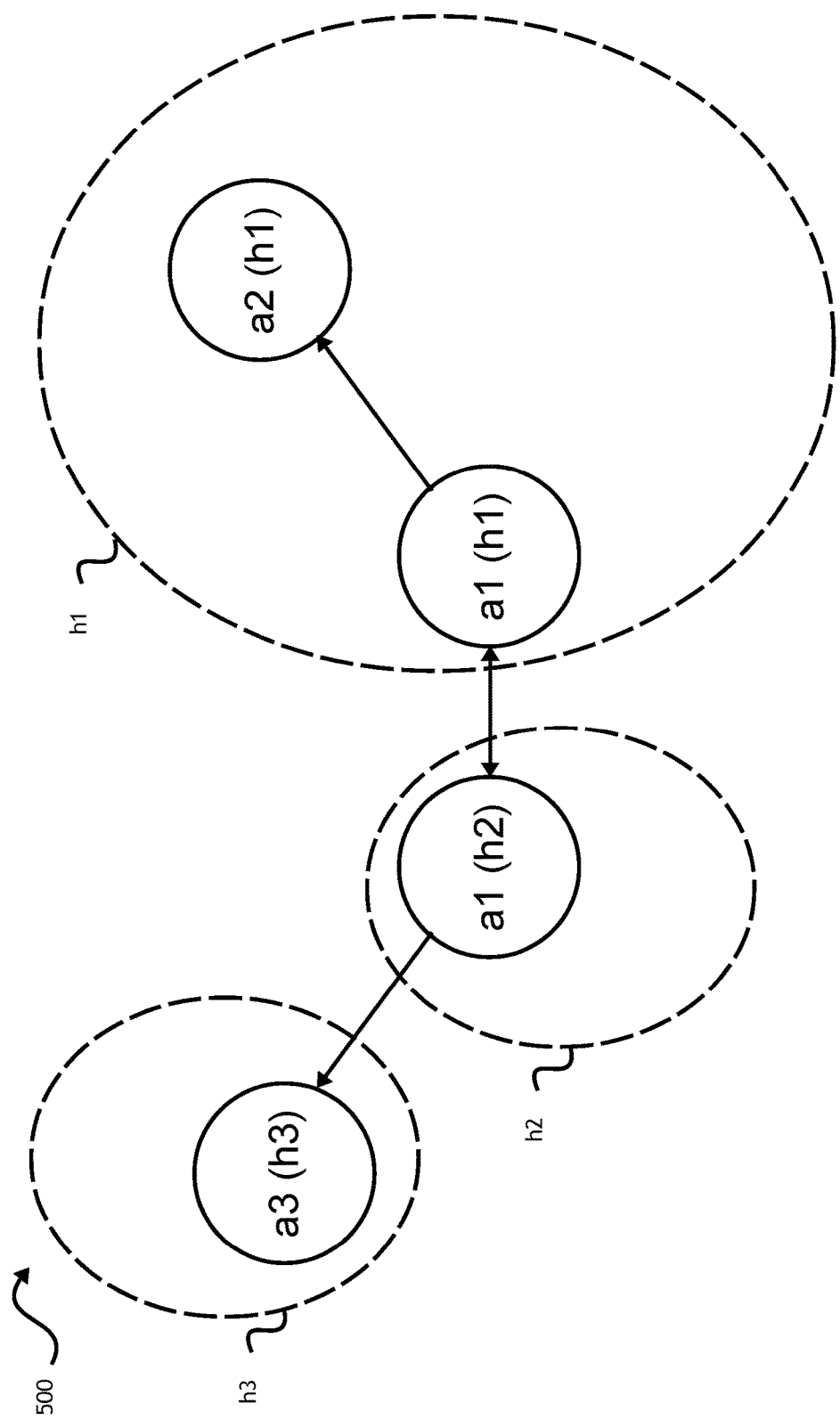

For the purpose of illustration, referring now to FIGS. 5A-5B, FIGS. 5A-5B are diagrams of an exemplary implementation 500 of a non-limiting embodiment relating to process 300 shown in FIG. 3. As shown in FIGS. 5A-5B, implementation 500 may include a plurality of servers and/or hosts, e.g., server h1, server h2, and server h3. In some non-limiting embodiments or aspects, the servers (e.g., h1-h3) may be the same as, similar to, or part of system 300. Additionally or alternatively, at least some of the servers (e.g., h1-h3) may be implemented (e.g., completely, partially, and/or the like) by another system, another device, another group of systems, or another group of devices, separate from or including system 300, such as transaction service provider system 102 (e.g., one or more devices of transaction service provider system 102), issuer system 104 (e.g., one or more devices of issuer system 104), customer device 106, merchant system 108 (e.g., one or more devices of merchant system 108), acquirer system 110 (e.g., one or more devices of acquirer system 110), and/or the like. In some non-limiting embodiments or aspects, the servers (e.g., h1-h3) may be configured to perform (e.g., completely, partially, and/or the like) process 400.

In some non-limiting embodiments or aspects, each of the servers (e.g., h1-h3) may be associated with at least one account (e.g., account a1, account a2, and/or account a3), as described herein. In some non-limiting embodiments or aspects, at least one account (e.g., account a1) may be associated with multiple servers (e.g., server h1 and server h2).

In some non-limiting embodiments or aspects, each account (e.g., a1-a3) may be associated with an account type, an application, and/or the like, as described herein. Additionally or alternatively, each server (e.g., h1-h3) may be associated with an environment type, as described herein. In some non-limiting embodiments or aspects, each environment may be in at least one category, including production or non-production. For example, a production environment may be an environment in which applications, services, and/or the like are available to customers (e.g., external customers). Additionally or alternatively, a non-production environment is an environment (e.g., internal environment) in which the applications, services, and/or the like are not available to customers (e.g., external customers) but are available to at least one internal user. For example, non-production environments may include development, quality assurance, testing, laboratory, integration, and/or the like environments. In some non-limiting embodiments or aspects, each application may have a criticality rating, as described herein.

In some non-limiting embodiments or aspects, at least one account (e.g., a1-a3) on at least one server (e.g., h1-h3) may have direct and/or credential-free access to at least one other account and/or server, as described herein. For the purpose of illustration, as shown in FIG. 5A, account a1 on server h1 may have (directional) direct and/or credential-free access to account a2 on server h1, as described herein. Additionally or alternatively, account a1 on server h2 may have (directional) direct and/or credential-free access to account a3 on server h3, as described herein.

In some non-limiting embodiments or aspects, new access (e.g., new direct and/or credential-free access) may be granted. For the purpose of illustration, as shown in FIG. 5B, account a1 on server h1 may be granted direct and/or credential-free access to account a1 on server h2, as described herein. Additionally or alternatively, account a1 on server h2 may be granted direct and/or credential-free access to account a1 on server h1, as described herein.

In some non-limiting embodiments or aspects, at least one account (e.g., a1-a3) on at least one server (e.g., h1-h3) may have indirect and/or transitive access to at least one other account and/or server, as described herein. For the purpose of illustration, as shown in FIG. 5B, as a result of the granting of the direct and/or credential-free access between account a1 on server h1 and account a1 on server h2, account a1 on server h1 may gain indirect and/or transitive access to account a3 on server h3 through account a1 on server h2, as described herein. Additionally or alternatively, account a1 on server h2 may gain indirect and/or transitive access to account a2 on server h1 through account a1 on server h1, as described herein.

Figure 5C:
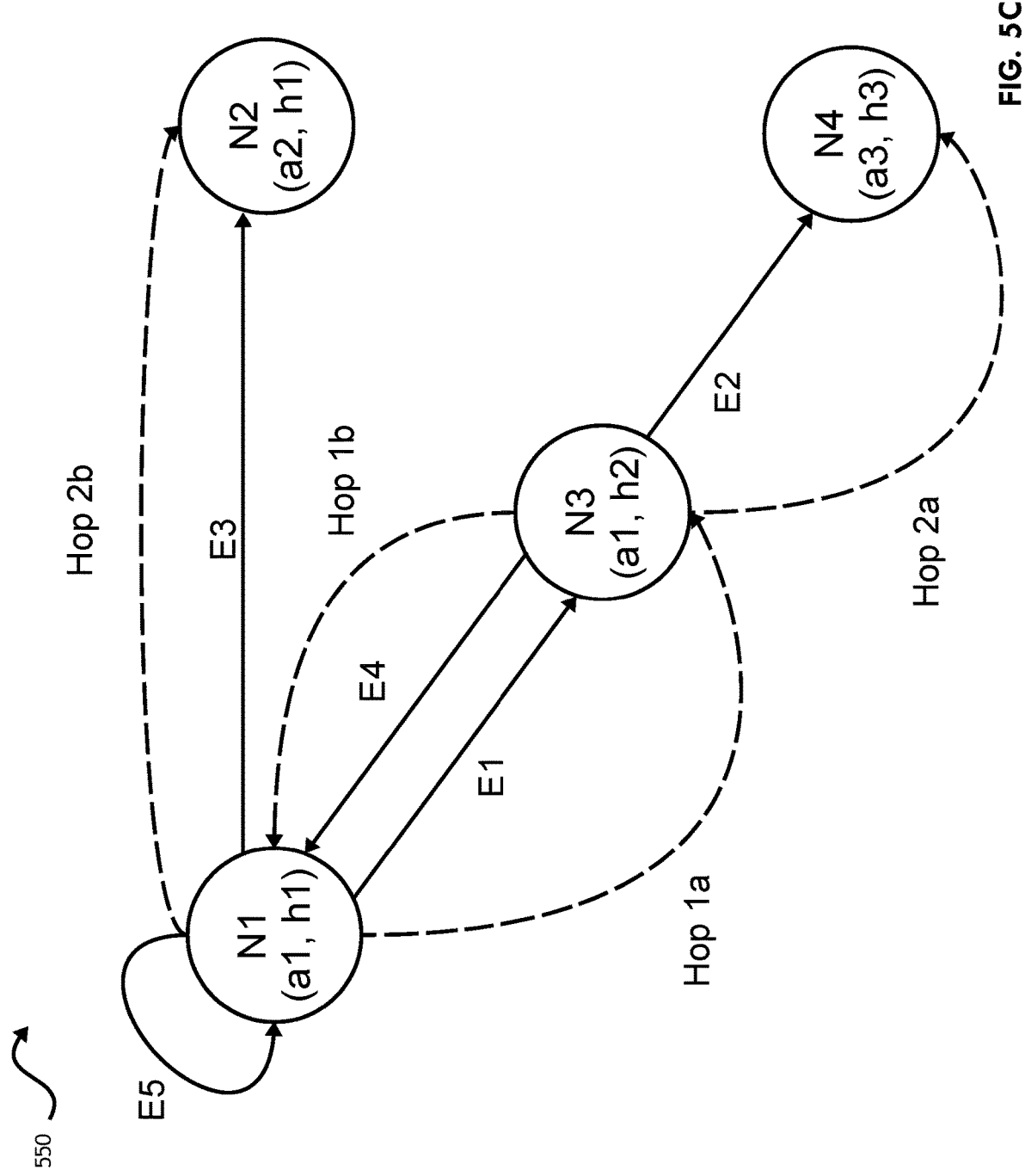
FIG. 5C is a diagram of a non-limiting embodiment or aspect of a graph of a non-limiting embodiment of the process shown in FIG. 3 according to the principles of the presently disclosed subject matter.

Referring now to FIG. 5C, FIG. 5C is a diagram of an exemplary graph 550 of a non-limiting embodiment relating to process 300 shown in FIG. 3. As shown in FIG. 5C, graph 550 may include a set of nodes, e.g., node N1, node N2, node N3, and node N4. For example, graph platform 302h may generate the set of nodes (N1-N4). In some non-limiting embodiments or aspects, the set of nodes may include a node (e.g., N1-N4) for each account (e.g., a1-a3) of each server (e.g., h1-h3) of a network of servers (e.g., implementation 500), as described herein. Additionally or alternatively, each node (e.g., N1-N4) may be a separate device, a separate server, a separate computing system, and/or the like, connected to at least one of the other nodes (e.g., N1-N4) by a network, as described herein.

For the purpose of illustration, as shown in FIG. 5C, node N1 may be associated with account a1 on server h1. Additionally or alternatively, node N2 may be associated with account a2 on server h1. Additionally or alternatively, node N3 may be associated with account a1 on server h2. Additionally or alternatively, node N4 may be associated with account a3 on server h3.

Referring again to FIG. 4, at step 404, process 400 may include determining access (e.g., direct and/or credential-free access) between the nodes. For example, graph platform 302h may determine (e.g., for each respective node of the set of nodes) at least one other node of the set of nodes (e.g., N1-N4) having direct and/or credential-free access to the respective node. Additionally or alternatively, graph platform 302h may determine which other node(s) has direct and/or credential-free access to each respective node based on the key data 302e, as described herein.

For the purpose of illustration, as shown in FIGS. 5B-5C, at least one node (e.g., N1-N3) may have direct and/or credential-free access to at least one other node, as described herein. For example, node N1 may have direct and/or credential-free access to node N2, and node N1 may have direct and/or credential-free access to node N3, as described herein. Additionally or alternatively, node N3 may have direct and/or credential-free access to node N1, and node N3 may have direct and/or credential-free access to node N4, as described herein.

In some non-limiting embodiments or aspects, at least one node may have direct and/or credential-free access to itself (e.g., self-access, such as the node may have a private key associated with the public key of the node and/or the like). For example, node N1 may have direct and/or credential-free access to itself (e.g., self-access), as described herein.

In some non-limiting embodiments or aspects, such direct and/or credential-free access may be key-based access, e.g., public-key cryptography, asymmetric cryptography, private-key cryptography, Secure Shell (SSH) network protocol, key manager (e.g., Universal Key Manager (UKM)), and/or the like. In some non-limiting embodiments or aspects, each node of the set of nodes may include (e.g., store, be assigned, and/or the like) a public key. Additionally or alternatively, for each respective node, the at least one other node having credential-free access to the respective node may include (e.g., store, be assigned, and/or the like) a private key associated with the public key of the respective node. In some non-limiting embodiments or aspects, the public key and private key may be SSH keys and/or the like.

For the purpose of illustration, to generate the nodes and determining the direct/credential-free accesses, graph platform 302h may perform the following algorithm, represented in pseudo-code:

Algorithm 1
1) Group private key identifiers (e.g., fingerprint identifiers (fIDs)) by node (e.g., combination of account and server/host) into a list (e.g., pkAcctHostGrouped)
2) For each node (e.g., account/host combination) in pkAcctHostGrouped
   a. Get the account type (e.g., user, service, or root) (e.g., from account data 302d)
   b. Get the user/privilege data 302f (e.g., user(s), UPM access, and/or the like)
   c. Get the environment type (e.g., from each server) and associated criticality rating (e.g., from criticality data 302g)
   d. Get list of associated fIDs
   e. For each fID:
      i. Create a list/dictionary (e.g., pkAttributesDict) of private key attributes for all attributes of the node
      ii. Create a node (e.g., including account (acct), server (host), fID, user(s)/privileges (UPM), private key(s), pkAttributesDict)
      iii. Add node (e.g., account/host combination) to a chain (e.g., pkChain[acctHost])
      iv. Add node to a list (e.g., nodeList), and add index of the node in nodeList to a list/dictionary (e.g., AHDict[acctHost])
      v. Add node to the node dictionary (nodeDict[Acct, Host, fID])

Referring again to FIG. 4, at step 406, process 400 may include generating edges. For example, graph platform 302h may generate, for each respective node, an edge connecting the respective node to each of the other node(s) having direct and/or credential-free access to the respective node. In some non-limiting embodiments or aspects, the set of nodes and the edges may define a graph.

In some non-limiting embodiments or aspects, the edges may be directional. For example, one edge may denote that one node (e.g., one of the other node(s)) may have direct and/or credential-free access to another node (e.g., the respective node), but not necessarily the other way (e.g., the respective node may not necessarily have access to the other nodes). Additionally or alternatively, if two nodes (e.g., the respective node and one of the other node(s)) each have access to the other, two directional edges may be generated: one from the first (e.g., other) node to the second (e.g., respective) node, and one from the second node to the first node.

In some non-limiting embodiments or aspects, at least one edge (e.g., some edges, all edges, and/or the like) may be directionless and/or bidirectional. For example, a bidirectional edge between two nodes (e.g., the respective node and one of the other node(s)) may denote that each of the two nodes has access to the other.

For the purpose of illustration, as shown in FIG. 5C, an edge (e.g., E1-E5) may be generated for each node (e.g., N1-N3) that has direct and/or credential-free access to at least one other node, as described herein. For example, edge E3 may be generated based on node N1 having direct and/or credential-free access to node N2, and edge E1 may be generated based on node N1 having direct and/or credential-free access to node N3, as described herein. Additionally or alternatively, edge E4 may be generated based on node N3 having direct and/or credential-free access to node N1, and edge E2 may be generated based on node N3, which may have direct and/or credential-free access to node N4, as described herein. In some non-limiting embodiments or aspects, edge E5 may be generated based on node N1 having direct and/or credential-free access to itself (e.g., self-access), as described herein.

For the purpose of illustration, to generate the edges of the graph, graph platform 302h may perform the following algorithm, represented in pseudo-code:

Algorithm 2
1) For each fID:
   a. Get the list (e.g., pkAcctHosts) of associated private key and node (e.g., account/host) combinations
   b. Get the list (e.g., akAcctHosts) of associated public/authorized key and node (e.g., account/host) combinations
   c. For each private key/account/host combination (e.g., pkAcctHost) in pkAcctHosts:
      i. Get corresponding node from node dictionary (e.g., nodeDict[Acct, Host, fID])
      ii. For each public key/account/host combination (akAcctHost in akAcctHosts)
         1. Get the account type (e.g., user, service, or root) (e.g., from account data 302d)
         2. Get the user/privilege data 302f (e.g., user(s), UPM access, and/or the like)
         3. Get the environment type (e.g., from each server) and associated criticality rating (e.g., from criticality data 302g)
         4. Create a public key attributes list/dictionary (e.g., akAttributesDict) for all attributes of the node
         5. If the public key/account/host combination is not in the private key chain (e.g., akAcctHost is not in pkChain)
            a. If the public key/account/host combination and the corresponding fID is in the node dictionary (e.g., acct, host, and fID is in the nodeDict)
               I. Get destination node from node dictionary
               II. Add edge from source node to destination node
         6. Else, if the public key/account/host combination is in the private key chain (e.g., akAcctHost in pkChain)
            a. Set the destination node(s) (e.g., destNodes) equal to the public key/account/host combination in the private key chain (destNodes=pkChain[akAcctHost])
            b. for each destination node (e.g., destNode) in the destination node list (e.g., destNodes)
               I. Add edge from source node to destination node
         7. If the public key/account/host combination and the corresponding fID are not in the node dictionary (Acct, Host, and fID are not in the nodeDict):
            a. Create a new destination node (e.g., destNode=node (acct, host, fID, user, UPM, public, akAttributesDict))
            b. Add edge from source node to destination node (e.g., destNode)
            c. Add destination node (e.g., destNode) to node list (nodeList, index to acctHostDict)
            d. Add destination node to the node dictionary 2) Add all edges to the directed graph Referring again to FIG. 4, at step 408, process 400 may include determining weights. For example, graph platform 302h may determine a weight for each edge (e.g., E1-E5), each node (e.g., N1-N4), and/or the like. Additionally or alternatively, graph platform 302h may determine the weight based on account data 302d, key data 302e, user/privilege data 302f, and/or criticality data 302g, as described herein.

In some non-limiting embodiments or aspects, graph platform 302h may determine the weight for each edge (e.g., E1-E5). For example, the weight of each edge (e.g., E1-E5) may be based on a number of users associated with the account of the other node (e.g., the node with direct and/or credential-free access to the respective node). Additionally or alternatively, graph platform 302h may determine the number of users associated with each account based on account data 302d and/or user/privilege data 302f. In some non-limiting embodiments or aspects, some users and/or services may have credentialed (e.g., password-based and/or the like) access to and/or impersonation rights associated with an account of a node. For example, users (or services) A, B, and C may each have access to account a1 of node N1. Additionally or alternatively, each of users A, B, and C may have direct access to Node N3 (via edge E1) and indirect access to node N4 (via edges E1 and E2, i.e., Hop 1a and Hop 2a) due to the credentialed access to node N1.

In some non-limiting embodiments or aspects, each account (e.g., a1-a3) may be associated with an account type (e.g., in account data 302d), each account may be associated with an application having an application criticality rating (e.g., in criticality data 302g), each server (e.g., h1-h3) may be associated with an environment type, and/or the like. Additionally or alternatively, determining the weight for each edge (e.g., E1-E5) may include determining the weight for each edge further based on at least one of the account type of the account (e.g., a1-a3) of the respective node, the account type of the account of the other node connected by the edge (e.g., E1-E5), the environment of the server (e.g., h1-h3) of the respective node, the environment of the server of the other node connected by the edge, the application criticality rating of the application associated with the account of the respective node, or the application criticality rating of the application associated with the account of the other node connected by the edge. In some non-limiting embodiments or aspects, determining the weight for each edge (e.g., E1-E5) may include determining the weight for each edge further based on whether the account (e.g., a1-a3) of the respective node (e.g., N1-N4) and the account of the at least one other node are the same account (e.g., the same account has access to multiple servers, resulting in multiple nodes and/or the like).

In some non-limiting embodiments or aspects, graph platform 302h may receive a rules configuration file 302i associated with rules for determining the weight for each edge (e.g., E1-E5) and/or node (e.g., N1-N4). Additionally or alternatively, determining the weight for each edge (e.g., E1-E5) and/or node (e.g., N1-N4) may include determining the weight further based on the rules configuration file 302i. In some non-limiting embodiments or aspects, rules configuration file 302i may be a spreadsheet, CSV file, extensible markup language (XML) file, and/or the like. Additionally or alternatively, rules configuration file 302i may include fields, parameters, features, attributes, variables, settings, a set of rules, and/or the like. Additionally or alternatively, rules configuration file 302i may include data associated with what data should be used as input (e.g., from data source(s) such as account data 302d, key data 302e, user/privilege data 302f, criticality data 302g, and/or the like), where and how to obtain the data (e.g., an address at one of the aforementioned data sources and/or the like), what portions, features, attributes, fields, parameters, and/or the like of the data should be used, how determinations should be made based on the data, and/or the like.

In some non-limiting embodiments or aspects, the weight for each node (e.g., N1-N4) may be determined in the same way as or in a similar way to determining the weight of each edge (e.g., E1-E5), as described above. Additionally or alternatively, rather than assigning the weight to each edge (e.g., E1-E5), the weight may be assigned to one of the nodes (e.g., N1-N4), such as the other node connected by the edge to the respective node.

For the purpose of illustration, to calculate the weights of the edges of the graph, graph platform 302h may perform the following algorithm, represented in pseudo-code:

Algorithm 3
1) Get the weight for the source node account type (e.g., from account data 302d)
   a. If it is a root account, add one to the weight (e.g., Weight=Weight+1)
   b. If it is a service account, add three to the weight (e.g., Weight=Weight+3)
   c. If it is a user account, add five to the weight (e.g., Weight=Weight+5)
2) Get the weight for the destination node account type (e.g., from account data 302d)
   a. If it is a root account, add one to the weight (e.g., Weight=Weight+1)
   b. If it is a service account, add three to the weight (e.g., Weight=Weight+3)
   c. If it is a user account, add five to the weight (e.g., Weight=Weight+5)
3) If the source node and destination node have the same account name (e.g., from account data 302d), add one to the weight (e.g., Weight=Weight+1)
4) Get the weight for the environment type for each node (e.g., from each server)
   a. If the source environment is non-production and the destination is production, add ten to the weight (e.g., Weight=Weight+10)
   b. If the source environment is production and the destination is non-production, add five to the weight (e.g., Weight=Weight+5)
5) Get the criticality rating weight (e.g., from criticality data 302g)
   a. If the source criticality rating is less than the destination criticality rating, add five to the weight (e.g., Weight=Weight+5)
   b. If the source criticality rating is greater than the destination criticality rating, add ten to the weight (e.g., Weight=Weight+10)
6) Get the source user weight (e.g., from user/privilege data 302f, such as UPM and/or the like)
   a. If the number of user permissions to the source node is greater than 0, add the number of user permissions to the weight score (e.g., Weight=Weight+number of user permissions)
7) Return the edge weight for the edge between the source and destination node Referring again to FIG. 4, at step 410, process 400 may include determining indirect access (e.g., transitive access and/or the like) between the nodes. For example, graph platform 302h may determine, for at least one (e.g., some, all, and/or the like) first node of the set of nodes (e.g., N1-N4), at least one second node having indirect (e.g., transitive and/or the like) access to the first node via a path of edges (e.g., E1-E5) from the second node(s) through at least one other node having direct and/or credential-free access to the at least one first node.

In some non-limiting embodiments or aspects, graph platform 302h may traverse all paths from a given node (e.g., first node) using a graph traversal algorithm (e.g., breadth-first traversal, depth first traversal, and/or the like). Additionally or alternatively, the processor or device may determine all nodes (e.g., second nodes) with indirect (e.g., transitive and/or the like) access to the given node (e.g., first node) based on the paths. In some non-limiting embodiments or aspects, the paths for each given (e.g., first) node may be stored (e.g., by graph platform 302h, output database 302k, and/or the like). Additionally or alternatively, the graph traversal algorithm may be repeated for each respective node of the graph, and/or the paths from each respective node to each node with indirect access thereto may be stored (e.g., by graph platform 302h, output database 302k, and/or the like).

For the purpose of illustration, as shown in FIG. 5C, in some non-limiting embodiments or aspects, at least one node (e.g., N1 or N3) may have indirect and/or transitive access to at least one other node (e.g., N4 or N2, respectively), as described herein. For example, node N1 may have indirect and/or transitive access to node N4 via edge E1 (e.g., Hop 1a) from node N1 to node N3 and edge E2 (e.g., Hop 2a) from node N3 to node N4, as described herein. In some non-limiting embodiments or aspects, each edge along a path of edges for indirect and/or transitive access may be called a hop. For example, referring to the indirect and/or transitive access from node N1 to node N4, Hop 1a may refer to edge E1 from node N1 to node N3, and Hop 2a may refer to edge E2 from node N3 to node N4. Additionally or alternatively, node N3 may have indirect and/or transitive access to node N2 via edge E4 (e.g., Hop 1b) from node N3 to node N1 and edge E3 (e.g., Hop 2b) from node N1 to node N2, as described herein.

Referring again to FIG. 4, at step 412, process 400 may include determining the weight of each path. For example, graph platform 302h may determine, for each respective second node (e.g., each respective node with indirect access to another node), a weight of the path of edges between the respective second node and the first node based on the weight of the each edge of the path of edges.

In some non-limiting embodiments or aspects, the weight of each path may be a sum of the weights of each edge of the path.

In some non-limiting embodiments or aspects, graph platform 302h (and/or governance platform 302j) may receive a query from user device 302u. For example, the query may identify a respective node of the graph. Additionally or alternatively, graph platform 302h (and/or governance platform 302j) may communicate output data (e.g., the nodes and edges of the graph, a visualization of at least a portion of the graph, the total weight of all paths connected to the respective node, an identification of and/or weight of each path (and/or all nodes thereof) including at least one indirect access to the respective node, and/or the like) to user device 302u in response to the query. In some non-limiting embodiments or aspects, user device 302u may receive the output data, display the output data, store the output data, and/or the like.

For the purpose of illustration, graph platform 302h may determine (e.g., automatically/autonomously, in response to a query, and/or the like) the weight(s) of the path(s) of edges to each root node by performing the following algorithm, represented in pseudo-code:

Algorithm 4
1) Build list of all roots with public keys (Destination)
   a. For each account/host/fID combination in the node dictionary (acct, Host, fID in nodeDict):
      i. If node is a root account ('root' in acct, Host, fID) and the node has a public key (nodeDict[acct, Host, fID].pubfid)
         1. Add the node to the roots list (roots.append (nodeDict[acct, Host, fID])
2) For each root in the roots list
   a. Run graph traversal (e.g., breadth-first search (BFS)) from root (this returns a graph of all nodes with access to root called rootGraph)
   b. For each edge in the rootGraph
      i. Calculate edge weight between the two nodes
      ii. Add the edge weight to the total graph weight
   c. Get neighbors for the current root
   d. Reverse graph (flip direction back towards root)
   e. For each node in the rootGraph (bfsNodeList)
      i. Check if the node is a user account
      ii. Get user (e.g., UPM) permissions for the node
      iii. Add all distinct host to the set distinctHostAccess
      iv. Get the maximum amount of hops
   f. For each node in neighbors list (get all nodes with shortest path)
      i. Add account and host information to the set directHostAccess
   g. Reverse the directed graph
   h. Plot a figure of the graph
   i. Add associated columns to the high level data table For the purpose of illustration, the output (e.g., high level data table) for all root nodes may include the columns of the following table:

TABLE 1

| Root Node | Highest weight | Number of direct access (shortest path) | Number of user (UPM) permissions | Total Number of Users | Number of Distinct Host Accesses | Max Hops |
|---|---|---|---|---|---|---|
| Host name of a root node | The highest weight of any path to the root host | Total number of host that have only one SSH connection away from the root host | Total number of UPM Permission associated with the root host | Total number of users that can access that root host | Total number of host that have distinct access to the root host | Maximum number of hops it takes to get to that root host |

For the purpose of illustration, graph platform 302h may determine (e.g., in response to a query and/or the like) the weight(s) of the path(s) of edges to a specific node (e.g., the root of a particular server/host) by performing the following algorithm, represented in pseudo-code:

Algorithm 5
1) Prompt user to enter a specific root host name
2) Get all fIDs for that specific root host combination (indexList)
3) For each index in the indexList
   a. If the index is a root with a public key
      i. Remove self-access—Iterate through the indexList and remove any account host combinations with different fIDs
   b. Build each root with the account and host combination (rootGraph)
   c. Plot the directed rootGraph
   d. Get all leaf nodes in the graph and store in a list (leafNodes)
   e. For each leaf node in leaf node list
      i. Get all simple paths and store in a list (paths)
      ii. For each path in paths
         1. Add root host to root host data frame
         2. Add path number to pathNumber data frame
         3. Add total hops to totalHops data frame
         4. For each node in the path
            a. Get user (e.g., UPM) access for that particular node
            b. Get the node information (account, Host, fID, number of user (e.g., UPM) permissions)
            c. If the first node in the path has already been passed
               I. Get the edge weight between previous node and current node II. Add edge weight to the total path weight
4) Add all columns to a table for the requested root host data For the purpose of illustration, the output (e.g., root host data table) for a specific root node may include the columns of the following table:

TABLE 2

| Root Host | Path Number | Number of user Permissions | Total Hops | User access | Node 1 | Node 2 | ... Node n |
|---|---|---|---|---|---|---|---|
| Host name of the specific root host entered | Count of the path number | Total number of UPM permissions along the path | Total number of hops along the path | Total number of user accounts that have access to the root host | Node information: Account, Host, fID, Total number of UPM Permissio Ns | Node information: Account, Host, fID, Total number of UPM Permissio ns | ... Node information: Account, Host, fID, Total number of UPM Permissio ns |

For the purpose of illustration, graph platform 302h may output (e.g., to user device 302u, output database 302k, and/or the like) a table and/or file including all indirect (e.g., transitive) accesses from the graph and/or the weight of the paths for each indirect access by performing the following algorithm, represented in pseudo-code:

Algorithm 6
1) Get all public root accounts
2) For all roots (e.g., for each root in a list called roots)
   a. Create a root graph (rootGraph)
   b. Remove self-access (For each node in the rootGraph)
      i. If a node has the same account and host but different fIDs as the current root, remove the node
   c. Reverse direction of the graph back towards current root
   d. Get all leaf nodes (leaf Nodes)
   e. Loop through each leaf node (e.g., for each leaf in leafNodes)
      i. Get all the paths from the leaf node to current root
         1. Loop through paths (e.g., for each path in a set called paths)
            a. For each node in the current path
            I. If the access count is less than the path length minus two, get the dictionary attributes for that node
3) Add all columns to a Rule Engine table For the purpose of illustration, the output (e.g., Rule Engine table) may include the columns of the following table:

TABLE 3

| Private Key Size | Private Key Algorithm | Private key fingerprint | Private key fingerprint ID | Private record creation date | Public key size | Public key algorithm | Public record creation date |
|---|---|---|---|---|---|---|---|

In some non-limiting embodiments or aspects, graph platform 302h may receive (e.g., from user device 302u and/or the like) a request for assessing a new direct/credential-free access between two nodes and/or between an existing node and a new node. For example, the request may identify a respective node of the graph to which direct/credential-free access is requested. Additionally or alternatively, graph platform 302h may simulate inserting a new edge corresponding to the new direct/credential-free access and/or simulate inserting new node(s) into the graph. Additionally or alternatively, graph platform 302h may at least partially repeat steps 402-412 based on the simulated insertions of the edge(s) or node(s) and may communicate output data (e.g., the nodes and edges of the graph, a visualization of at least a portion of the graph, the total weight of all paths connected to the new/simulated edge and/or node, an identification of and/or weight of each path (and/or all nodes thereof) connected to the new/simulated edge and/or node, and/or the like). In some non-limiting embodiments or aspects, user device 302u may receive the output data, display the output data, store the output data, and/or the like.

With continued reference to FIG. 4, at step 414, process 400 may include terminating access. For example, graph platform 302h, governance platform 302j, user device 302u, and/or the like may terminate credential-free access between at least one first node and at least one of the other node(s). In some non-limiting embodiments or aspects, the access may be terminated based on the weight of a path of edges passing therethrough (e.g., the total weight of the path of edges between at least one second node and the first node through the other node(s)). Additionally or alternatively, the access may be terminated based on the rules/configuration file 302i, which may include rules (e.g., for graph platform 302h and/or governance platform 302j) for terminating access based on the weight(s) of such path(s).

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A method for controlling access in a network of servers, each server associated with at least one account, comprising:
   generating, with at least one processor, a set of nodes comprising a node for each account of each server of a network of servers, wherein each account is associated with an application having an application criticality rating;

for each respective node of the set of nodes, determining, with at least one processor, at least one other node of the set of nodes having credential-free access to the respective node;

for each respective node of the set of nodes, generating, with at least one processor, an edge connecting the respective node to each of the at least one other node of the set of nodes having credential-free access to the respective node, the set of nodes and the edges comprising a graph;

determining, with at least one processor, a weight for each edge based on a number of users associated with the account of the at least one other node, wherein determining the weight for each edge comprises determining the weight for each edge further based on at least one of the application criticality rating of the application associated with the account of the respective node, the application criticality rating of the application associated with the account of the at least one other node, or any combination thereof;

for at least one first node of the set of nodes, determining, with at least one processor, at least one second node of the set of nodes having indirect access to the at least one first node via a path of edges from the at least one second node through at least one of the at least one other node having credential-free access to the at least one first node; and for each respective second node of the at least one second node, determining, with at least one processor, a weight of the path of edges between the respective second node and the at least one first node based on the weight of each edge of the path of edges.

2. The method of claim 1, wherein each node of the set of nodes comprises a public key.

3. The method of claim 2, wherein, for each respective node of the set of nodes, the at least one other node of the set of nodes having credential-free access to the respective node comprises a private key associated with the public key of the respective node.

4. The method of claim 1, wherein each account is associated with an account type and each server is associated with an environment type, and wherein determining the weight for each edge comprises determining the weight for each edge further based on at least one of the account type of the account of the respective node, the account type of the account of the at least one other node, the environment of the server of the respective node, the environment of the server of the at least one other node, or any combination thereof.

5. The method of claim 4, wherein determining the weight for each edge comprises determining the weight for each edge further based on whether the account of the respective node and the account of the at least one other node are the same account.

6. The method of claim 1, further comprising terminating, with at least one processor, credential-free access between the at least one first node and the at least one of the at least one other node based on the weight of the path of edges between the at least one second node and the at least one first node through the at least one of the at least one other node.

7. The method of claim 1, further comprising receiving, with at least one processor, a rules configuration file associated with rules for determining the weight for each edge, wherein determining the weight for each edge comprises determining the weight for each edge further based on the rules configuration file.

8. A system for controlling access in a network, comprising:

a network of servers, each server associated with at least one account;

at least one processor; and at least one non-transitory computer-readable medium comprising instructions to direct the at least one processor to:

generate a set of nodes comprising a node for each account of each server of a network of servers, wherein each account is associated with an application having an application criticality rating;

for each respective node of the set of nodes, determine at least one other node of the set of nodes having credential-free access to the respective node;

for each respective node of the set of nodes, generate an edge connecting the respective node to each of the at least one other node of the set of nodes having credential-free access to the respective node, the set of nodes and the edges comprising a graph;

determine a weight for each edge based on a number of users associated with the account of the at least one other node, wherein determining the weight for each edge comprises determining the weight for each edge further based on at least one of the application criticality rating of the application associated with the account of the respective node, the application criticality rating of the application associated with the account of the at least one other node, or any combination thereof;

for at least one first node of the set of nodes, determine at least one second node of the set of nodes having indirect access to the at least one first node via a path of edges from the at least one second node through at least one of the at least one other node having credential-free access to the at least one first node; and for each respective second node of the at least one second node, determine a weight of the path of edges between the respective second node and the at least one first node based on the weight of each edge of the path of edges.

9. The system of claim 8, wherein each node of the set of nodes comprises a public key.

10. The system of claim 9, wherein, for each respective node of the set of nodes, the at least one other node of the set of nodes having credential-free access to the respective node comprises a private key associated with the public key of the respective node.

11. The system of claim 8, wherein each account is associated with an account type and each server is associated with an environment type, and wherein determining the weight for each edge comprises determining the weight for each edge further based on at least one of the account type of the account of the respective node, the account type of the account of the at least one other node, the environment of the server of the respective node, the environment of the server of the at least one other node, or any combination thereof.

12. The system of claim 11, wherein determining the weight for each edge comprises determining the weight for each edge further based on whether the account of the respective node and the account of the at least one other node are the same account.

13. The system of claim 8, wherein the instructions further direct the at least one processor to terminate credential-free access between the at least one first node and the at least one of the at least one other node based on the weight of the path of edges between the at least one second node and the at least one first node through the at least one of the at least one other node.

14. The system of claim 8, wherein the instructions further direct the at least one processor to receive a rules configuration file associated with rules for determining the weight for each edge,
wherein determining the weight for each edge comprises determining the weight for each edge further based on the rules configuration file.

15. A computer program product for controlling access in a network of servers, each server associated with at least one account, the computer program product comprising at least one non-transitory computer-readable medium including one or more instructions that, when executed by at least one processor, cause the at least one processor to:
generate a set of nodes comprising a node for each account of each server of a network of servers, wherein each account is associated with an application having an application criticality rating;
for each respective node of the set of nodes, determine at least one other node of the set of nodes having credential-free access to the respective node;
for each respective node of the set of nodes, generate an edge connecting the respective node to each of the at least one other node of the set of nodes having credential-free access to the respective node, the set of nodes and the edges comprising a graph;
determine a weight for each edge based on a number of users associated with the account of the at least one other node, wherein determining the weight for each edge comprises determining the weight for each edge further based on at least one of the application criticality rating of the application associated with the account of the respective node, the application criticality rating of the application associated with the account of the at least one other node, or any combination thereof;
for at least one first node of the set of nodes, determine at least one second node of the set of nodes having indirect access to the at least one first node via a path of edges from the at least one second node through at least one of the at least one other node having credential-free access to the at least one first node; and
for each respective second node of the at least one second node, determine a weight of the path of edges between the respective second node and the at least one first node based on the weight of each edge of the path of edges.

16. The computer program product of claim 15, wherein each node of the set of nodes comprises a public key, and
wherein, for each respective node of the set of nodes, the at least one other node of the set of nodes having credential-free access to the respective node comprises a private key associated with the public key of the respective node.

17. The computer program product of claim 15, wherein each account is associated with an account type and each server is associated with an environment type, and
wherein determining the weight for each edge comprises determining the weight for each edge further based on at least one of the account type of the account of the respective node, the account type of the account of the at least one other node, the environment of the server of the respective node, the environment of the server of the at least one other node, or any combination thereof.

18. The computer program product of claim 17, wherein determining the weight for each edge comprises determining the weight for each edge further based on whether the account of the respective node and the account of the at least one other node are the same account.

19. The computer program product of claim 15, wherein the instructions further direct the at least one processor to terminate credential-free access between the at least one first node and the at least one of the at least one other node based on the weight of the path of edges between the at least one second node and the at least one first node through the at least one of the at least one other node.

20. The computer program product of claim 15, wherein the instructions further direct the at least one processor to receive a rules configuration file associated with rules for determining the weight for each edge, and
wherein determining the weight for each edge comprises determining the weight for each edge further based on the rules configuration file.

* * * * *